Patented Nov. 21, 1950

2,530,408

UNITED STATES PATENT OFFICE 2,530,408

DITHIOCYANATES

Eldon E. Stahly, Pittsburgh, Pa., assignor to Koppers Company, Inc., Pittsburgh, Pa., a corporation of Delaware No Drawing. Application December 28, 1945,
Serial No. 637,764

7 Claims. (Cl. 260—454)

This invention relates to compositions of matter and is particularly directed to novel cycloolefin dithiocyanates as new compounds.

The novel compounds of the invention are dithiocyanates of cyclo-olefins in which the cycloolefin structure is fused with an aromatic ring structure. They are prepared by reacting the cyclo-olefin with nascent thiocyanogen as obtained for example by the action of copper sulfate on sodium thiocyanate. By this reaction two thiocyanate groups are added to the double bond to form the desired cyclo-olefin dithiocyanate.

Typical cyclo-olefins which may be dithiocyanated to produce novel compounds according to the invention include 1,2-dihydronaphthalene, 1,4-dihydronaphthalene and indene. Each of these compounds is characterized by a fused ring structure, one ring of which is cyclo-olefin, and the other of which is an aromatic ring. In using the word "fused" and in speaking of "a fused ring structure," I refer to "a polycyclic compound in which two rings have two atoms in common." (Hackh's Chemical Dictionary, third edition, p. 363.) By "cyclo-olefin," I mean an olefin in which the unsaturation is comprised in a ring in contradistinction to the linear olefines in which the unsaturation is comprised in an open chain.

The invention may be more fully understood by reference to the following examples in which the parts are by weight unless otherwise specified and are in the c. g. s. system.

EXAMPLE I

*1,2-dithiocyano-1,2,3,4-tetrahydronaphthalene-(benzocyclohexylene 1,2-dithiocyanate)*

35 parts of 1,2-dihydronaphthalene and 161 parts of sodium thiocyanate were added to 400 volume parts of 95 per cent ethanol. While vigorously agitating the mixture, a solution of 150 parts of copper sulfate pentahydrate in 400 volume parts of water was added dropwise over a period of 75 minutes. The copper sulfate solution was at 60° C. at the start of the addition and had cooled to 40° C. a few minutes before addition was completed. The reaction mixture was at 25° C. at the start and rose gradually to 36° C. over the period of addition of copper sulfate solution. No external source of heat was employed; the temperature rise was due to the heat of reaction and the initial temperature of the copper sulfate solution. The final yellow mixture was stirred until the temperature had fallen to 30° C. It was then warmed to 60° and 400 volume parts of benzene was added. After fifteen minutes of stirring, the mixture was filtered and the benzene layer was separated from the aqueous layer of the filtrate. The residual solid on the filter (NaSCN, reaction product, perthiocyanic acid, etc.) was extracted with 300 volume parts of benzene and the aqueous filtrate likewise was extracted with 400 volume parts of benzene. The last two benzene solutions were filtered and added to the first benzene extract. Evaporation under reduced pressure, with a small stream of inert gas to hasten the process, resulted in 50 parts of an oil concentrate. Dissolving in 200 volume parts of 95 per cent ethanol, boiling and filtering removed a yellow-orange solid, presumably perthiocyanic acid. The alcohol was evaporated in a stream of inert gas, the oily residue was dissolved in 300 volume parts of ether, diluted with 300 volume parts petroleum ether, concentrated to 300 volume parts by evaporation at room temperature and the crystalline solid was separated by filtration. The yield was 26 parts or 40 per cent of the theoretical yield of the dihydronaphthalene dithiocyanate. The melting point was 73–76° C. A few parts were crystallized from 95 per cent ethanol to give crystals melting at 79–80° C. Analysis showed 11.15 per cent nitrogen in comparison with 11.38 per cent nitrogen required by theory. The analogous derivative prepared from 1,4-dihydronaphthalene (Example II) melted at 117–120° C. A mixture of these two derivatives melted at 70–75° C. The lowering of the melting point by mixing proves that the two derivatives are separate and distinct identities.

EXAMPLE II

*2,3-dithiocyano-1,2,3,4-tetrahydronaphthalene-(benzocyclohexene 2,3-dithiocyanate)*

30 parts of 1,4-dihydronaphthalene were dissolved in 200 volume parts of 95 per cent ethanol and placed in a reactor with a solution of 125 parts sodium thiocyanate in 125 parts of water. While stirring the reaction mixture vigorously, there was introduced a solution of 125 parts of copper sulfate pentahydrate in 250 volume parts of water, dropwise over a period of 50 minutes. The temperature of the copper sulfate solution was 60° C. at the start and was about 40° C. at the end of the addition. The reaction mixture was at 30° C. at the beginning and was 37° C. at the end of the addition of the copper sulfate solution. The maximum temperature reached during this period was 40° C. The reaction mixture was still brown (due to cupric thiocyanate) after all the CuSO4 solution had been added. Stirring was continued with slight warming on a water bath (to maintain the temperature at 35° to 40° C.) until the mixture was yellow in color (1.5 hours) and for 25 minutes more thereafter. The development of the yellow color is due to conversion of the dark cupric thiocyanate to yellow cuprous thiocyanate simultaneous with the release of nascent thiocyanogen.

The final reaction mixture was extracted twice with 300 and 400 volume parts of benzene. The benzene layers after filtration were separated from the water layer and combined. Evaporation gave 26 parts of orange-yellow crystals. A Sohxlet extraction of the solid residue with benzene yielded another part of crystals. This represents a yield of crude dithiocyanate of about 47 per cent. Recrystallization from hot 95 per cent ethyl alcohol resulted in yellow needles melting at 120° C. The analysis of the crystals gave a sulfur content of 27.8 per cent (Theor. 26.03 per cent) and 11.32 per cent nitrogen (Theor. 11.37 per cent).

EXAMPLE III

*Indene dithiocyanate (benzocyclopentene dithiocyanate)*

To a mixture of 162 parts of sodium thiocyanate with 400 volume parts of ethyl alcohol there was added, with stirring, 25 parts of indene. The indene was completely dissolved in the alcohol but the sodium thiocyanate was not. While agitating this mixture, there was added dropwise over a period of 45 minutes a solution of 175 parts of copper sulfate pentahydrate in 400 volume parts of water. The temperature of the copper sulfate solution was 60° C. at the start of the addition but dropped to 50° C. at the end of the addition. The alcohol indene-sodium thiocyanate mixture was at 25° C. at the start and gradually increased in temperature as the reaction progressed until it reached 41° C. at the end. Stirring was continued for fifteen minutes during which period the temperature fell to 38° C. An initial dark color due to formation of cupric thiocyanate gradually changed to yellow as the cuprous thiocyanate formed simultaneous with the release of nascent thiocyanogen.

The final mixture consisted of this yellow solid cuprous thiocyanate, the aqueous alcohol solution of sodium sulfate and the organic reaction product. The indene thiocyanate together with impurities were extracted from this mixture by stirring with three successive portions of benzene, the benzene layers being separated between successive extractions. The volumes of benzene employed were 500, 400 and 300 volume parts respectively. The resultant benzene solutions were combined, filtered, and evaporated in a suction flask under reduced pressure at room temperature. A thick reddish oily product remained. It was taken up in benzene (300 volume parts) whereupon a yellow solid remained. This appeared to be perthiocyanic acid. It was filtered off and discarded. The benzene filtrate was evaporated at room temperature in a stream of inert gas for 18 hours; 40 parts of red crude oil remained, which by analysis was 87 per cent pure indene dithiocyanate (69 per cent of theoretical yield of crude product). One-third of this oil was further purified by dissolving in benzene (350 volume parts), filtering, evaporating to 50 volume parts, and throwing out of solution by adding 300 volume parts of petroleum ether having a 30° to 90° C. boiling range. After standing at room temperature for eight hours, the petroleum ether was decanted from the oil layer. The oil after evaporation of traces of the solvent in an inert gas stream represented a 69 per cent recovery of the crude oil, 4 parts of light-yellow oil remaining in the decanted petroleum ether solution. Analysis showed the oil to be 93 per cent pure indene thiocyanate.

The compounds of the invention are useful as active ingredients in insecticidal and pharmaceutical compounds, as intermediates for preparation of disulfides for the same purposes, and as intermediates in preparation of disulfonic acids useful in the field of soaps and detergents. They may be isomerized to diisothiocyanates by heat, and the diisothiocyanates in turn may be reduced to diamino derivatives, etc.

I claim:

1. A composition of matter comprising a benzocycloalkene dithiocyanate.
2. A composition of matter comprising a benzocyclohexene dithiocyanate.
3. A composition of matter comprising a benzocyclopentene dithiocyanate.
4. A composition of matter comprising 1,2-dithiocyano-1,2,3,4-tetrahydronaphthalene.
5. A composition of matter comprising 2,3-dithiocyano-1,2,3,4-tetrahydronaphthalene.
6. A composition of matter comprising an ac-orthodithiocyano tetrahydronaphthalene.
7. A composition of matter comprising a hydrocarbon cyclo-olefin dithiocyanate in which the cyclo-olefin structure is fused with an aromatic ring structure.

ELDON E. STAHLY.

REFERENCES CITED

The following references are of record in the file of this patent:

UNITED STATES PATENTS

| Number | Name | Date |
|---|---|---|
| 1,765,678 | Kaufmann | June 24, 1930 |
| 2,122,781 | Salzberg | July 5, 1938 |
| 2,169,700 | Loane | Aug. 15, 1939 |
| 2,214,039 | Borglin | Sept. 10, 1940 |
| 2,217,613 | Borglin | Oct. 8, 1940 |
| 2,239,496 | Borglin | Apr. 22, 1941 |
| 2,272,400 | Borglin | Feb. 10, 1942 |
| 2,275,606 | Borglin | Mar. 10, 1942 |
| 2,394,583 | Bruson | Feb. 12, 1946 |

FOREIGN PATENTS

| Number | Country | Date |
|---|---|---|
| 404,175 | Germany | Oct. 13, 1924 |

OTHER REFERENCES

Beilstein, "Handbuch der Org. Chem.," 4th ed., vol. VI, pp. 985 and 987.